United States Patent [19]

Prince

[11] E Patent Number: Re. 31,861

[45] Reissued Date of Patent: Apr. 9, 1985

[54] SINGLE LEVER REMOTE CONTROL FOR ENGINE THROTTLE AND CLUTCH

[75] Inventor: Anthony P. Prince, Waukegan, Ill.

[73] Assignee: Outboard Marine Corporation, Waukegan, Ill.

[21] Appl. No.: 440,415

[22] Filed: Nov. 9, 1982

Related U.S. Patent Documents

Reissue of:

[64] Patent No.: 4,232,771
Issued: Nov. 11, 1980
Appl. No.: 1,486
Filed: Jan. 8, 1979

U.S. Applications:

[63] Continuation of Ser. No. 789,798, Apr. 22, 1977, abandoned.

[51] Int. Cl.[3] ..... B60K 29/02

[52] U.S. Cl. ..... 192/0.096; 74/876

[58] Field of Search ..... 192/0.096, 0.098, 0.084, 192/0.07; 74/876, 878, 477, 473 P, 471 XY

[56] References Cited

U.S. PATENT DOCUMENTS

| | | | |
|---|---|---|---|
| 2,924,987 | 2/1960 | Pierce . | |
| 2,986,044 | 5/1961 | Parsons | 192/0.098 X |
| 3,057,221 | 10/1962 | Smith | 192/0.096 X |
| 3,115,050 | 12/1963 | Marr . | |
| 3,127,785 | 4/1964 | Morse et al. | 192/0.096 X |
| 3,130,598 | 4/1964 | Burham | 192/0.096 X |
| 3,204,732 | 9/1965 | Morse | 192/0.096 |
| 3,309,938 | 3/1967 | Pervier | 192/0.096 X |
| 3,335,618 | 8/1967 | Russey . | |
| 3,780,842 | 12/1973 | Whipple | 74/876 X |
| 3,842,695 | 10/1974 | Farrington et al. | 192/0.098 X |
| 4,090,598 | 5/1978 | Prince | 192/0.096 |
| 4,144,956 | 3/1979 | Baba | 192/0.096 |

*Primary Examiner*—George H. Krizmanich
*Attorney, Agent, or Firm*—Robert E. Clemency

[57] ABSTRACT

[Disclosed herein is] A throttle control for an engine including a housing supporting a control lever for rotation relative to a neutral position, a throttle lever movably mounted on the housing and adapted to actuate the engine throttle, a throttle drive member including a drive pin and mounted for rotation in response to movement of the control lever from the neutral position, and a cam member connected between the throttle lever and the throttle drive member. The cam member includes a cam track receiving the drive pin and having a shape effective to displace the cam member relative to the throttle drive member, transversely relative to the rotational axis of the throttle drive member, so as to move the throttle lever in response to rotation of the throttle drive member.

In one embodiment, the control further includes a shift lever movably mounted on the housing and adapted to actuate the engine clutch and a shift drive member drivingly connected to the shift lever for actuating the engine clutch in response to movement of the control lever from the neutral position. The cam track is arranged so that the cam member, and thus the throttle lever, remains in an engine idle position during initial movement of the control lever from the neutral position to actuate the engine clutch and so that further movement of the control lever from the neutral position causes translatory movement of the cam member to advance the engine throttle.

13 Claims, 9 Drawing Figures

SINGLE LEVER REMOTE CONTROL FOR ENGINE THROTTLE AND CLUTCH

Matter enclosed in heavy brackets [ ] appears in the original patent but forms no part of this reissue specification; matter printed in italics indicates the additions made by reissue.

This is a continuation of application Ser. No. 789,798, filed Apr. 22, 1977, now abandoned.

BACKGROUND OF THE INVENTION

The invention relates generally to single lever controls for regulating the throttle and clutch associated with an internal combustion engine. More specifically, the invention relates to single lever controls for marine propulsion devices, such as outboard motors and stern drive units.

Single lever controls generally include a main control lever which is pivotally movable in opposite directions from a neutral position through a clutch operating range to effect clutch operation without affecting the engine throttle setting and subsequently through a throttle control range whereby the engine speed is increased without affecting clutch actuation. As a result, clutch actuation occurs before there is any appreciable advancement of the throttle and the clutch cannot be reversed before the throttle is returned to an idle speed setting.

One general type of single lever control includes means for selectively disconnecting the main control lever from the clutch actuation mechanism when the main control lever is in the neutral position so that the main control lever can be moved independently of the clutch actuation mechanism to advance the throttle setting while the clutch is in the neutral position for engine warm-up. Prior art constructions of this type of single lever controls often include fairly complex mechanisms, particularly those including lockout means for preventing clutch actuation when the throttle is at an advance setting, and usually require lateral movement of the push-pull control cable(s) connecting the control to the remotely located engine clutch and/or throttle. Also, many prior art constructions do not include a positive means for preventing throttle advance during the clutch actuation, but instead rely on the normal backlash in the throttle control cable and throttle linkage to absorb any movement which otherwise would cause throttle advancement.

Examples of prior art single lever controls of this general type are disclosed in the following U.S. Pat. Nos.: Parsons 2,986,044 issued May 30, 1961, Morse et al 3,127,785 issued Apr. 7, 1964, Morse 3,204,732 issued Sept. 7, 1965, Pervier 3,309,938 issued Mar. 21, 1967, Farrington et al 3,842,695 issued Oct. 22, 1964.

Reference is also made to the copending United States Prince Application Ser. No. 767,556, filed on Feb. 10, 1977, U.S. Pat. No. 4,090,558 issued May 23, 1978 and assigned to the assignee of this application.

SUMMARY OF THE INVENTION

The invention provides a throttle control for an engine having a throttle, which control includes a housing, a control lever mounted on the housing for rotation relative to a neutral position, a throttle lever movably mounted on the housing and adapted to actuate the engine throttle in response to movement of the throttle lever, a throttle drive member including a drive pin and mounted on the housing for rotation in response to movement of the control lever from the neutral position, a cam member connected between the throttle lever and the throttle drive member and including a cam track which receives the drive pin and has a shape effective to displace the cam member relative to the throttle drive member to move the throttle lever in response to rotation of the throttle drive member, and guide means located on the cam member and on the housing for guiding movement of the cam member in response to movement of the drive pin in the cam track.

In one embodiment, the throttle control includes a shaft member rotatably mounted on the housing and connected to the control lever for common rotation therewith, the throttle drive members is mounted on the shaft member for common rotation therewith, and the guide means affords translatory movement of the cam member relative to the rotational axis of the shaft member.

In one embodiment, the guide means includes a bushing carried by the housing and having a bearing surface which, in part, is concentric with the rotational axis of the shaft member and the cam member includes wall means defining a slot in the cam member and engaging the bearing surface.

In one embodiment, the throttle control includes a shift lever adapted to actuate a remotely located engine clutch and movably mounted in the housing for movement between a neutral position and a shift position in response to movement of the shift lever, and means connecting the shift lever to the shaft member for moving the shift lever from the neutral position to the shift position in response to rotational movement of the control lever from the neutral position. In this embodiment, the throttle drive member is connected to the shaft member for common rotation therewith, the cam member is connected for translatory movement relative to the rotational axis of the shaft member between an idle position and a throttle advance position in response to rotation of the throttle drive member, and the cam track includes a central portion extending at a uniform radius in the rotational axis of the shaft member and end portions extending from the central portion at increasing distances from the rotational axis of the shaft member, whereby the cam member remains in the idle position while the throttle drive pin travels in the cam track central portion in response to rotation of the throttle drive member and the cam member moves from the idle position to a throttle advance position after the drive pin enters into and travels in one of the cam track end portions in response to rotation of the throttle drive member.

In one embodiment, the shaft member is further supported within the housing for axial movement relative to the housing and to the throttle drive member between first and second positions in response to axial movement of the control lever, the shift lever is connected to the shaft member by a shift drive member mounted on the shaft member for common axial movement and for relative rotary movement, the shift lever is connected with the shift drive member for movement from a neutral position to the shift position in response to movement of the control lever from the neutral position and for axial movement of the shift drive member relative to the shift lever in response to axial movement of the control lever, and the shift drive member and the throttle drive member are releasably connected together by drive means which provide common rotary movement of the shift drive member and the throttle drive member when the shaft member is in the first position and permits relative rotation of the shift member and the shift drive member when the shaft member is in the second position.

One of the principal features of the invention is the provision of a throttle control for an engine including a control lever adapted to actuate the engine throttle and means for positively preventing advance of the engine throttle during a predetermined amount of movement of the control lever from a neutral position.

Another of the principal features of the invention is the provision of such a throttle control which is arranged to effect smooth throttle pick-up after the control lever has been moved a predetermined amount from the neutral position.

A further principal feature of the invention is the provision of a throttle control for an engine including a control lever, a throttle lever adapted to actuate the engine throttle, a throttle drive member including a drive pin and mounted for rotation in response to rotation of the control lever from a neutral position, and a cam member connected between the throttle lever and the throttle drive member and including a cam track which receives the drive pin and has a shape effective to displace the cam member transfersely relative to the rotational axis of the throttle drive member and move the throttle lever in response to rotation of the throttle drive member.

A further principal feature of the invention is the provision of a throttle control as described in the preceding paragraph and including a shift lever adapted to actuate the engine clutch, a shift drive member drivingly connected to the shift lever for actuating the engine clutch in response to movement of the control lever from the neutral position, and wherein the cam track is arranged so that the cam member, and thus the throttle lever, remains in an idle position during initial movement of the control lever from the neutral position and so that further movement of the control lever from the neutral position causes translatory movement of the cam member relative to the rotational axis of the throttle drive member to advance the engine throttle.

A still further principal feature of the invention is the provision of a throttle control as described in the preceding paragraph including means mounting the control lever for axial movement relative to the housing between first and second positions, means mounting the shift drive member for rotation relative to and common axial movement with the control lever, and means for releasably connecting the shift drive member and the throttle drive member in driving engagement when the control lever is in the first position, whereby the shift drive member is disengaged from the throttle drive member in response to axial movement of the control lever from the first to second position and the throttle drive member thereafter can be rotated relative to the shift drive member by the control lever for operating the throttle independently of the clutch for engine warm-up.

Other features and advantages of the embodiments of the invention will become apparent to those skilled in the art upon reviewing the following detailed description, the drawings and the appended claims.

Figure 4:
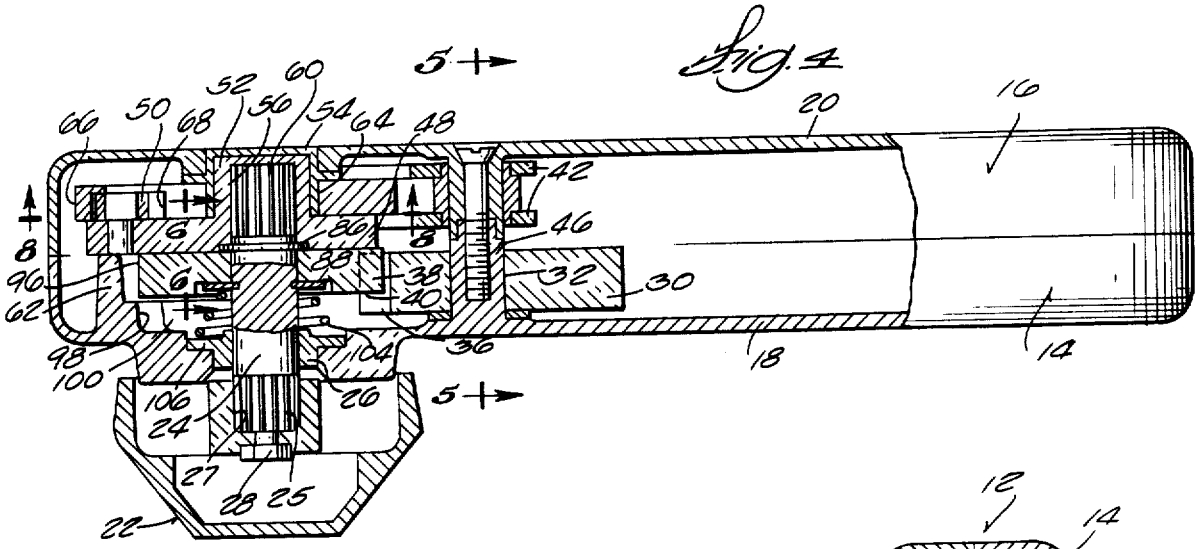
FIG. 4 is a partial sectional view taken generally along line 4—4 in FIG. 2.

Before explaining at least one embodiment of the invention in detail, is to be understood that the invention is not limited in its application to the details of construction and the arrangements of the components set forth in the following description or illustrated in the drawing. The invention is capable of other embodiments and of being practiced and carried out in various ways. Also, it is to be understood that the phraseology and terminology employed herein is for the purposes of description and should not be regarded as limiting.

GENERAL DESCRIPTION

Illustrated in the drawings is a single lever control for operating the clutch and throttle of the remotely located marine propulsion device such as an outboard motor or a stern drive unit. A single lever control 10 embodying various features of the invention includes (FIG. 1) a housing 12 comprised of opposed cover halves or sections 14 and 16 which include respective side walls 18 and 20 and which are suitably fastened together to form a generally closed housing.

The single lever control 10 includes a main control lever 22 extending exteriorly of the housing 12 for both pivotal or rotational movement and lateral or axial movement relative to the housing 12. Provided in part for this purpose (see FIG. 4) is a shaft member 24 having an outer end 25 journaled in the housing section 16 by a bearing 26. The shaft member 24 is suitably connected to the lower end of the main control lever 22 for both rotation and common lateral or axial movement therewith. In the specific construction illustrated, the outer end 25 of the shaft member 24 is provided with external splines which are received in an internally splined recess [2] *27* provided in the lower end of the main control lever 22 and the main control lever 22 is fastened to the shaft member 24 by a bolt 28 threaded into the outer end 25 of the shaft member 24.

Clutch control is provided by (see FIGS. 2, 3, 4 and 5) a shift arm or lever 30 pivotally or rotatably mounted on a stud or boss 32 extending from the cover section 14 with the lower end adapted for connection to a push-pull link or cable 34 which is operatively connected to a remotely located engine clutch (not shown). The shift lever 30 includes a gear segment 36 which meshes with a cooperating gear segment 38 provided on a shift drive member 40 which is mounted on the shaft member 24 for rotation between a neutral position and a shift position. As explained in more detail below, rotational movement of the main control lever 22 serves to rock the shift lever 30 about its pivotal mounting and thereby actuate the remotely located clutch.

Throttle control is provided by (see FIGS. 2, 3, 4 and 5) a pair of throttle arms or levers 42 which, at their lower ends, are adapted for connection to a push-pull link or cable 44 operatively connected to a remotely located engine throttle (not shown). The upper ends of the throttle levers 42 are mounted for pivotal movement about an axis fixed relative to the housing 12 such as on a stud or boss 46 extending from the cover section 16 coaxially with the boss 32 on the cover section 14.

Figure 2:
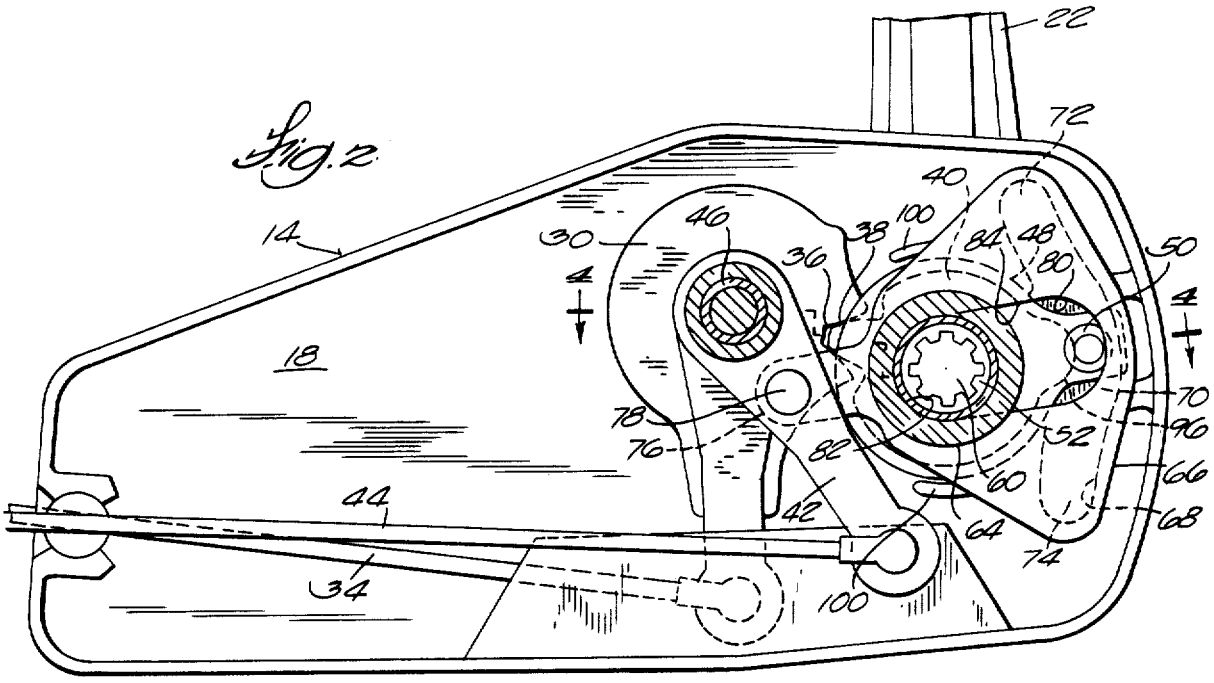
FIG. 2 is an enlarged sectional view taken generally along line 2—2 in FIG. 1, illustrating the location of various of the components when the main control lever is in the neutral position and in a connected position for coordinated operation of the engine throttle and clutch.

Means are provided for operatively connecting the throttle levers 42 to the main control lever 22 to control movement of the throttle levers 42 in response to pivotal or rotational movement of the main control lever 22 relative to the neutral position shown in FIG. 2. More specifically, (see FIGS. 2, 3 and 4) such means includes a throttle drive member 48 having a drive roller or pin 50 and a hub portion 52 which is journaled in the cover section 16 via a bushing 54 to afford rotation of the throttle drive member 48 coaxially with the shaft member 24.

Figure 7:
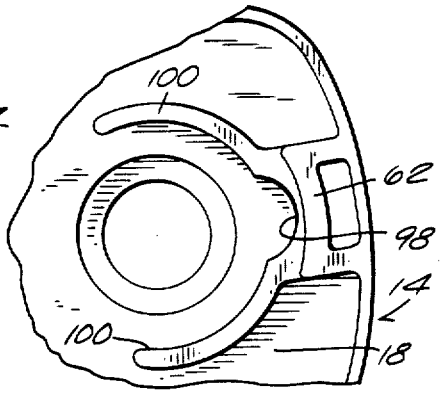
FIG. 7 is a fragmentary side view of the housing cover section of FIGS. 2 and 3, shown with various of the components removed.
Figure 5:
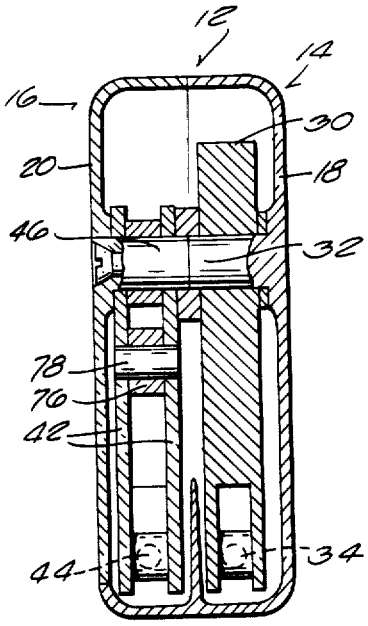
FIG. 5 is a sectional view taken generally along line 5—5 in FIG. 4.
Figure 1:
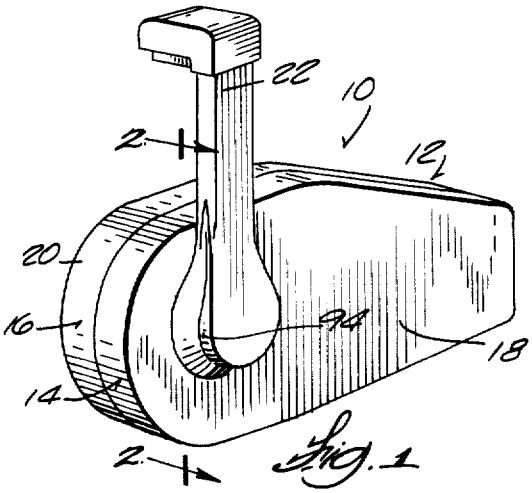
FIG. 1 is a perspective view of a single lever control which is particularly adaptable for use with a marine propulsion device and embodies various features of the invention.

The throttle drive member 48 is connected to the shaft member 24 for common rotation therewith and for axial movement of the shaft member 24, and thus the main control lever 22, relative to the throttle drive member 48. In the specific construction illustrated, (see FIG. 4) the throttle drive member 48 has a central bore 56 including a plurality of axially extending, circumferentially spaced splines which slidably receive and mesh with complementary axially extending, circumferentially spaced splines provided on the inner end portion 60 of the shaft member 24. Axial movement of the throttle drive member 48 relative to the housing 12 during axial movement of the shaft member 24 to the right as viewed in FIG. 1 is prevented (see FIGS. 4 and 7) by internal arcuate protuberance 62 provided on the cover section 14.

Figure 8:
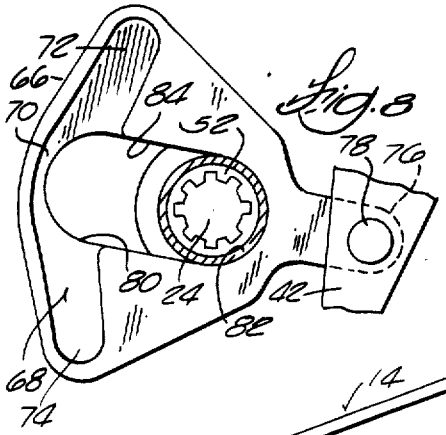
FIG. 8 is a fragmentary sectional view taken generally along line 8—8 in FIG. 4.

Mounted on (see FIGS. 2, 3, 4 and 8) a bearing surface or shank portion 64 of the bushing 54 is a cam element or member 66 including a throttle cam or track 68 which receives the drive pin 50 on the throttle drive member 48. As best illustrated in FIG. 8 wherein the drive pin 50 has been omitted for clarity, the cam track 68 includes a central portion 70 formed at a uniform radius from the rotational axis of the shaft member 24 and oppositely extending end portions 72 and 74 which project in the direction away from the central portion 70 at distances which increase from the rotational axis or center of the shaft member 24 with increasing distance from the central portion 70.

Means are provided for connecting the cam member 66 between the throttle drive member 48 and the throttle levers 42 whereby rotational movement of the throttle drive member 48, in response to displacement of the main control lever 22 from the neutral position, is converted into a translatory movement of the cam member 66 relative to the rotational axis of the shaft member 24 with a resultant movement of the throttle levers 42. While various arrangements can be used, in the specific construction illustrated, such means (see FIGS. 2, 3 and 8) includes providing the cam member 66 with an ear 76 which is located diametrically opposite to the drive pin 50 with respect to the rotational axis of the shaft member 24 when the throttle drive member 48 is in the neutral position. The ear 76 extends between the throttle levers 42 and is suitably pivotally connected thereto, such as by a pin 78, at a location intermediate their lower ends and their pivotal mounting. The cam element 66 includes an oblongslot 80 having an innermost circular portion 82 which is concentric with the rotation axis of the shaft member 24 when the throttle drive member 48 is in the neutral position and opposed walls 84 which engage the shank portion 64 of the bushing 54 and cooperate therewith so as to guide translatory movement of the cam member 66 during travel of the drive pin 50 in the cam track 68.

Figure 6:
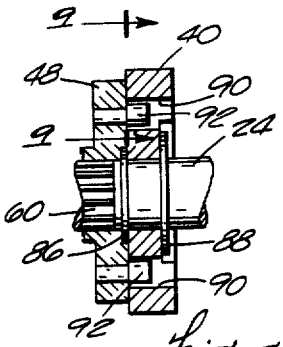
FIG. 6 is a fragmentary sectional view taken generally along line 6—6 in FIG. 4, illustrating the location of the shift drive member and the throttle drive member when the main control lever is in a connected position for coordinated operation of the engine throttle and clutch.

Means are provided for connecting the shift drive member 40 with the shaft member 24 to permit relative rotation between the shaft member 24 and the shift drive member 40 and to permit common axial movement of the shift drive member 40 with the shaft member 24, and thus with the main control lever 22. In the specific construction illustrated (see FIGS. 4 and 6), the shift drive member 40 is rotatably mounted on the shaft member 24. The opposite sides of the shift drive member 40 is engaged by respective retainer rings 86 and 88 carried on the shaft member 24 when the shaft member 24 is moved axially relative to the housing 12 in response to axial movement of the main control lever 22.

Means are provided on the throttle drive member 48 and on the shift drive member 40 for affording common rotary movement therebetween when the shaft member 24 is in a first position and for permitting rotation of the throttle drive member 48 relative to the shift drive member 40 when the shaft member is in a second position laterally or axially spaced from the first position. In the specific construction illustrated, such drive means (see FIG. 6) includes providing the shift drive member 40 with a pair of diametrically opposed drive holes or recesses 90 which receive and are drivingly engaged by a pair of diametrically opposed drive pins or lugs 92 provided on the throttle drive member 48 and extending laterally therefrom in a direction opposite to the drive pin 50. During normal operation, the drive lugs [22] *92* project into the drive recesses 90 and the shift drive member 40 and the throttle drive member 48 rotate in unison in response to rotational movement of the main control lever 22 from the neutral position. The cooperating gear segments 36 and 38 on the shift lever 30 and on the shift drive member 40 are arranged so that, when the main control lever 22 is moved in either rotative direction from the neutral position, the shift lever 30 is rotated to actuate the engine clutch. Such clutch actuation occurs promptly upon movement of the main control lever 22 from the neutral position.

The cam track 68 is shaped such that the drive pin 50 travels through the central portion 70 without displacing the cam member 66, and thus the throttle levers 42, during movement of the shift lever 30 to actuate the engine clutch. After completion of clutch actuation (see FIG. 3), the drive pin 50 enters one of the extending end portions 72 and 74 of the cam track 68, depending upon the direction of rotation of the main control lever 22.

Figure 3:
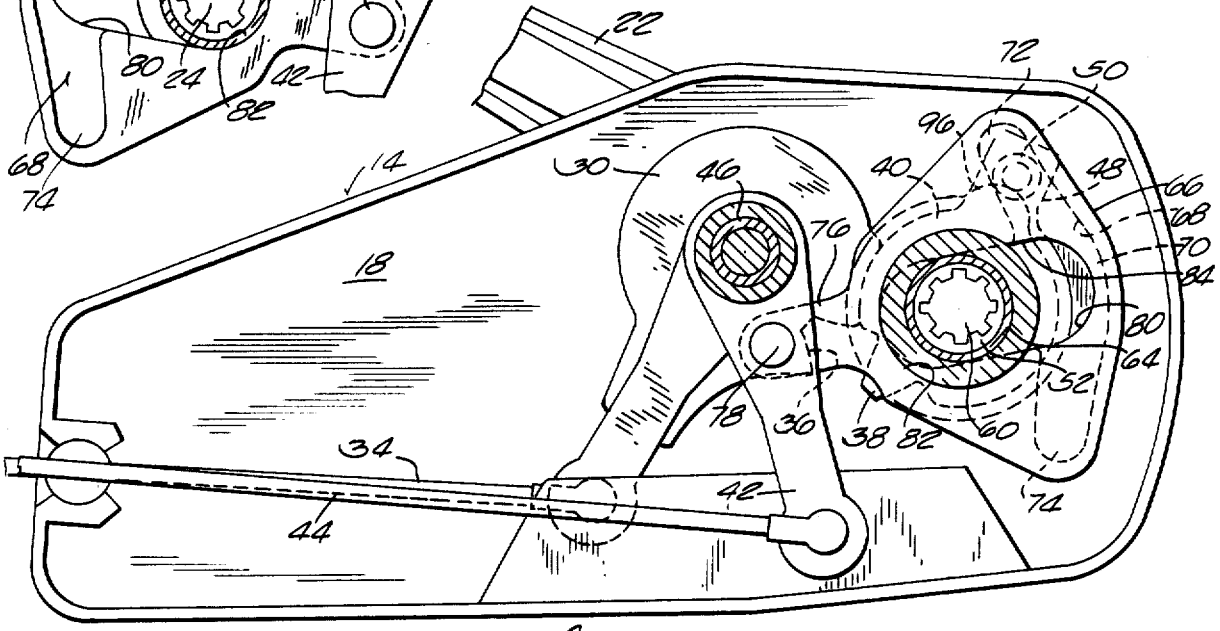
FIG. 3 is a view similar to FIG. 2, illustrating the location of various of the components when the main control lever is in the reverse speed range.

The shape of the end portions 72 and 74 of the cam track 68 causes the drive pin 50 to move the cam member 66 transversely relative to the rotational axis of the shaft member 24, in a direction generally coincident with the lingitudinal axis of the slot 80, so as to advance the throttle from idle without affecting the setting of the shift lever 30. The walls 84 of the cam element slot 80 cooperate with the shank portion 64 of the bushing 24 to guide this translatory movement of the cam member 66. FIG. 3 illustrates the location of various of the components when the main control lever 22 is located in the reverse speed range.

With this arrangement, the central portion 70 of the cam track 68 provides a period of lost motion or throttle dwell so as to positively insure there is no throttle advancement while clutch actuation is taking place. The end portions 72 and 74 of the cam track 68 provides a smooth, positive throttle advance after the clutch has been actuated, thereby assuring proper throttle pick-up for smooth boat operation. Different stroke clutch gears and/or rates of throttle pick-up can be accommodated by simply replacing the cam member 66 with one having a cam track 68 of the appropriate shape.

When it is desired to operate the throttle independently of the clutch for engine warm-up, the main control lever 22 is moved laterally or axially relative to the housing 12, i.e., moved to the right as viewed in FIG. 1, by grasping the handgrip 94 provided on the lower portion of the main control lever 22. This lateral or axial movement of the main control lever 22 moves the shift drive member 40 axially relative to the throttle drive member 48 and the drive recesses 90 are withdrawn from the drive lugs 92. At the same time, the shift drive member 40 moves axially relative to the shift lever 30 and there is no lateral displacement of either the throttle cable 44 or the clutch cable 34. During subsequent rotation of the main control lever 22 from the neutral position, the throttle is advanced in response to movement of the throttle drive member 48 and the shaft member 24 rotates relative to the shift drive member 40, i.e., the shift drive member 40 remains in a neutral position and the engine clutch is not actuated.

Lockout means are provided for permitting axial movement of the shift drive member 40 from an engaged position to a disengaged position in response to axial movement of the main control lever 22 when the main control lever is in the neutral position and for preventing axial movement of the shift drive member 40 from the engaged position when the main control lever 22 is displaced from the neutral position. In the specific construction illustrated, such lockout means (see FIGS. 2, 3 and 7) includes a radially extending lockout lug or ear 96 on the shift drive member 40 and a lockout notch or recess 98 provided in the interior of the cover section 14. The lockout recess 98 is located and dimensioned to receive the lockout ear 96 and permit the drive recesses 90 on the shift drive member 40 to be completely withdrawn from the drive lugs 92 on the throttle drive member 48 when the main control lever 22 is in the neutral position. Location of the lockout ear 96 in the lockout recess 98 prevents rotational movement of the shift drive member 40.

If outwardly axial movement of the main control lever 22 is attempted when the main control lever 22 is displaced from the neutral position, the lockout ear 96 engages (see FIG. 7) one of a pair of arcuate protuberances 100 projecting from the interior of the cover section 14 and extending the opposite directions from the lockout recess 98. The protuberances 100 are dimensioned to prevent the required axial movement of the shaft member 24 to withdraw the drive receses 98 from the drive lugs 92.

Figure 9:
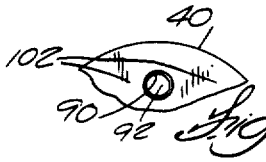
FIG. 9 is a reduced fragmentary view taken generally along line 9—9 in FIG. 6.

The lockout means preferably also include means for preventing both rotational movement of the shift drive member 40 from the neutral position and axial movement of the shift drive member 40 from the disengaged position when the shaft member 24 is in the second position and the main control lever 22 is displaced from the neutral position. In the specific construction illustrated, such means (see FIG. 9) includes providing the shift drive member 40 with camming surfaces 102 extending adjacent the drive recesses 90. When the shift drive member 40 is in the disengaged position and the main control lever 22 thereafter is pivoted in either rotative direction from the neutral position, the outer ends of the drive lugs 92 engage the camming surfaces 102. Thus, the camming surfaces 102, in cooperation with the drive lugs 92, serve to retain the lockout ear 96 in the lockout recess 98 when the main control lever is displaced from the neutral position, thereby locking the shift drive member in the neutral position shown in FIG. 2. Also, the camming surfaces 102 prevent the shift drive member 40 from being returned to the engaged position until the main control lever 22 is in the neutral position.

Means preferably are provided for automatically returning the shift drive member 40 from the disengaged position to the engaged position when the main control lever 22 has been returned to the neutral position after being moved axially for independent actuation of the engine throttle. In the specific construction illustrated, such means (see FIG. 4) includes a helical spring 104 encircling the shaft member 24 and disposed between the cover section 14 and the shift drive member 40 with one end received in an annular pocket 106 defined by the bearing 26 and the other end bearing against the retainer ring 88. When the main control lever 22 is returned to the neutral position wherein the drive recesses 90 are aligned with the drive lugs 92, the spring 104 moves the shift drive member 40 to the engaged position.

Various of the features of the invention are set forth in the following claims:

The embodiments of the invention in which an exclusive property or privilege is claimed are defined as follows:

[1. A throttle control for an engine having a throttle and a clutch, said control comprising a housing, a shaft member supported within said housing for rotation relative to said housing, a control lever connected to said shaft member for common rotation therewith relative to a neutral position, a shift lever mounted on said housing for movement between a neutral position and a shift position and adapted to actuate the engine clutch in response to movement of said shift lever, means connecting said shift lever to said shaft member for moving said shift lever from the neutral position to the shift position in response to rotational movement of said control lever from the neutral position, a throttle lever movable mounted on said housing and adapted to actuate the engine throttle in response to movement said throttle lever, a throttle drive member including a drive pin mounted on said shaft member for common rotation therewith in response to movement of said control lever from the neutral position, a cam member carried by said shaft member and connected between said throttle lever and said throttle drive member for movement between an idle position and a throttle advance position in response to rotation of said throttle drive member, said cam member including a cam track receiving said drive pin and having a shape effective to displace said cam member relative to said shaft member and to said throttle drive member to move said throttle lever in response to rotation of said throttle drive member, and guide means on said cam member and on said shaft member for guiding translatory movement of said cam member relative to the rotational axis of said shaft member in response to movement of said drive pin in said cam track.]

[2. A throttle control for an engine having a throttle and a clutch, said control comprising a housing, a shaft member supported within said housing for rotation relative to said housing, a control lever connected to said shaft member for common rotation therewith relative to a neutral position, a shift lever mounted on said housing for movement between a neutral position and a shift position and adapted to actuate the engine clutch in response to movement of said shift lever, means connecting said shift lever to said shaft member for moving said shift lever from the neutral position to the shift position in response to rotational movement of said control lever from the neutral position, a throttle lever movably mounted on said housing and adapted to actuate the engine throttle in response to movement of said throttle lever, a throttle drive member including a drive pin and mounted on said shaft member for common rotation therewith in response to movement of said control lever from the neutral position, a cam member carried by said shaft member and connected between said throttle lever and said throttle drive member for movement between an idle position and a throttle advance position in response to rotation of said throttle drive member, said cam member including a cam track receiving said drive pin and having a central portion extending at a uniform radius from the rotational axis of said shaft member and end portions extending from said central portion at increasing distances from the rotational axis of said shaft member, whereby said cam member remains in the idle position while said drive pin travels in said cam track central portion in response to rotation of said throttle drive member and said cam member moves from the idle position to a throttle advance position after said drive pin enters into and travels within one of said cam track end portions in response to rotation of said throttle drive member, and guide means on said cam member and on said shaft member for guiding translatory movement of said cam member relative to the rotational axis of said shaft member in response to movement of said drive pin in said cam track.]

[3. A throttle control according to claim 2 wherein said shaft member is further supported within said housing for axial movement relative to said housing and to said throttle drive member between first and second positions in response to axial movement of said control lever, wherein said means connecting said shift lever with said shaft member includes a shift drive member mounted on said shaft member for common axial movement therewith and for relative rotary movement therebetween and means connecting said shift lever and said shift drive member for moving said shift lever from a neutral position to the shift position in response to movement of said control lever from the neutral position and for permitting axial movement of said shift drive member relative to said shift lever in response to axial movement of said control lever, and wherein said control includes drive means for releasably connecting said shift drive member and said throttle drive member to provide common rotary movement of said shift drive member and said throttle drive member when said shaft member is in the first position and to permit relative rotation of said shift member and said shift drive member, in response to rotational movement of said control lever, when said shaft member is in the second position.]

4. A throttle control according to claim [3] *16* wherein said drive means includes at least one drive recess in said shift drive member and a drive lug on said throttle drive member drivingly engaged with said shift drive member recess when said shaft member is in the first position and disengaged from said shift drive member recess when said shaft member is in the second position.

5. A throttle control according to claim [3] *16* including lockout means for permitting axial movement of said shift drive member from an engaged position to a disengaged position when said control lever is in the neutral position and for preventing axial movement of said shift drive member from the engaged position when said control lever is displaced from the neutral position.

6. A throttle control according to claim 5 wherein said lockout means further includes means for preventing both rotational movement of said shift drive member from the neutral position and axial movement of said shift drive member from the disengaged position to the engaged position when said shaft member is in the second position and said control lever is displaced from the neutral position.

7. A throttle control according to claim 5 wherein said lockout means includes a recess in said housing and a lockout lug on said shift drive member located to project and to engage said housing recess and thereby lock said shift drive member in the neutral position when said shaft member is moved to the second position with said control lever in the neutral position and further includes arcuate protuberances extending on said housing in opposite directions from said housing recess and located to be engaged by said lockout lug in the event movement of said shaft toward the second position is attempted when said control lever is displaced from the neutral position.

8. A throttle control according to claim 7 wherein said lockout means further includes a camming surface extending on said shift drive member from said drive recess and adapted to engage the outer edge of said drive lug when said control lever is displaced from the neutral position after said shaft member has been moved to the second position and thereby retain said lockout lug in said housing recess.

9. A throttle control according to claim [3] *16* including means for biasing said shaft member towards the first position.

10. A throttle control according to claim 9 wherein said housing has a wall and wherein said biasing means comprises a helical spring encircling said shaft member and interposed said shift drive member and said housing wall.

*11. A throttle control for an engine having a throttle and a clutch, said control comprising a housing, a control lever mounted on said housing for rotation relative to a neutral position, a shaft member supported within said housing for rotation relative to said housing and connected to said*

*control lever for common rotation therewith, said shaft member being further supported within said housing for axial movement relative to said housing between first and second positions in response to axial movement of said control lever, a throttle lever movably mounted on said housing and adapted to be connected to the engine throttle for actuation thereof in response to movement of said throttle lever, a throttle drive member including a drive pin and connected to said shaft member for rotation in response to movement of said control lever from the neutral position, a shift lever adapted to be connected to the engine clutch for actuation thereof in response to shift lever movement, said shift lever being movably mounted on said housing for movement between a neutral position and a shift position in response to movement of said shift lever, means releasably connecting said shift lever to said shaft member so as selectively to move said shift lever from the neutral position to the shift position in response to rotational movement of said control lever from the neutral position and to permit relative rotation between said shift lever and said shaft member in response to rotational movement of said control lever, said means connecting said shift lever to said shaft member including a shift drive member mounted on said shaft member for relative rotary movement therebetween, means connecting said shift lever and said shift drive member, and drive means for releasably connecting said shift drive member and said throttle drive member to provide common rotary movement of said shift drive member and said throttle drive member when said shaft member is in the first position and to permit relative rotation between said shaft member and said shift drive member, in response to rotational movement of said control lever, when said shaft member is in the second position, a cam member connected between said throttle lever and said throttle drive member for movement between an idle position and throttle advance positions in response to rotation of said throttle drive member, said cam member including a cam track receiving said drive pin and having a central portion extending at a uniform radius from the rotational axis of said shaft member and end portions extending from said central portion at increasing distances from the rotational axis of said shaft member, and guide means located on said cam member and on said housing for guiding movement of said cam member in response to movement of said drive pin in said cam track, whereby said cam member remains in the idle position while said drive pin travels in said cam track central portion in response to rotation of said throttle drive member and said cam member moves from the idle position to a throttle advance position after said drive pin enters into and travels within one of said cam track end portions in response to rotation of said throttle drive member.*

*12. A control in accordance with claim 11 and further including lockout means for preventing rotation of said shift drive member when said shaft member is in said second position.*

*13. A throttle control for an engine having a throttle and a clutch, said control comprising a housing, a shaft member supported within said housing for rotation relative to said housing, a control lever connected to said shaft member for common rotation therewith relative to a neutral position, a shift lever mounted on said housing for movement between a neutral position and a shift position and adapted to be connected to the engine clutch for actuation thereof in response to movement of said shift lever, means connecting said shift lever to said shaft member for moving said shift lever from the neutral position to the shift position in response to rotational movement of said control lever from the neutral position, a throttle lever movably mounted on said housing and adapted to be connected to the engine throttle for actuation thereof in response to movement of said throttle lever, a throttle drive member including a drive pin mounted on said shaft member for common rotation therewith in response to movement of said control lever from the neutral position, a cam member carried by said shaft member and connected between said throttle lever and said throttle drive member for movement between an idle position and a throttle advance position in response to rotation of said throttle drive member, said cam member including a cam track receiving said drive pin and having a shape effective to displace said cam member relative to said shaft member and to said throttle drive member to move said throttle lever in response to rotation of said throttle drive member, and guide means on said cam member and on said shaft member for guiding translatory movement of said cam member relative to the rotational axis of said shaft member in response to movement of said drive pin in said cam track.*

*14. A throttle control for an engine having a throttle and a clutch, said control comprising a housing, a shaft member supported within said housing for rotation relative to said housing, a control lever connected to said shaft member for common rotation therewith relative to a neutral position, a shift lever mounted on said housing for movement between a neutral position and a shift position and adapted to be connected to the engine clutch for actuation thereof in response to movement of said shift lever, means connecting said shift lever to said shaft member for moving said shift lever from the neutral position to the shift position in response to rotational movement of said control lever from the neutral position, a throttle lever movably mounted on said housing and adapted to be connected to the engine throttle for actuation thereof in response to movement of said throttle lever, a throttle drive member including a drive pin and mounted on said shaft member for common rotation therewith in response to movement of said control lever from the neutral position, a cam member carried by said shaft member and connected between said throttle lever and said throttle drive member for movement between an idle position and a throttle advance position in response to rotation of said throttle drive member, said cam member including a cam track receiving said drive pin and having a central portion extending at a uniform radius from the rotational axis of said shaft member and end portions extending from said central portion at increasing distances from the rotational axis of said shaft member, whereby said cam member remains in the idle position while said drive pin travels in said cam track central portion in response to rotation of said throttle drive member and said cam member moves from the idle position to a throttle advance position after said drive pin enters into and travels within one of said cam track end portions in response to rotation of said throttle drive member, and guide means on said cam member and on said shaft member for guiding translatory movement of said cam member relative to the rotational axis of said shaft member in response to movement of said drive pin in said cam track.*

*15. A throttle control according to claim 14 wherein said shaft member is further supported within said housing for axial movement relative to said housing and to said throttle drive member between first and second positions in response to axial movement of said control lever, wherein said means connecting said shift lever with said shaft member includes a shift drive member mounted on said shaft member for common axial movement therewith and for relative rotary movement therebetween and means connecting said shift lever and said shift drive member for moving*

*said shift lever from a neutral position to the shift position in response to movement of said control lever from the neutral position and for permitting axial movement of said shift drive member relative to said shift lever in response to axial movement of said control lever, and wherein said control includes drive means for releasably connecting said shift drive member and said throttle drive member to provide common rotary movement of said shift drive member and said throttle drive member when said shaft member is in the first position and to permit relative rotation of said shaft member and said shift drive member, in response to rotational movement of said control lever, when said shaft member is in the second position.*

*16. A throttle and clutch control for an engine having a throttle and a clutch, said control comprising a housing, a control lever mounted on said housing for rotation relative to a neutral position, a shaft member supported within said housing for rotation relative to said housing and connected to said control lever for common movement therewith, a throttle lever movably mounted on said housing and adapted to be connected to the engine throttle for actuation thereof in response to movement of said throttle lever, a throttle drive member including a drive pin and connected to said shaft member for rotation in response to movement of said control lever from the neutral position, a cam member connected between said throttle lever and said throttle drive member for movement between an idle position and throttle advance positions in response to rotation of said throttle drive member, said cam member including a cam track receiving said drive pin and having a central portion extending at a uniform radius from the rotational axis of said shaft member and end portions extending from said central portion at increasing distances from the rotational axis of said shaft member, guide means located on said cam member and on said housing for guiding movement of said cam member in response to movement of said drive pin in said cam track, whereby said cam member remains in the idle position while said drive pin travels in said cam track central portion in response to rotation of said throttle drive member and said cam member moves from the idle position to a throttle advance position after said drive pin enters into and travels within one of said cam track end portions in response to rotation of said throttle drive member, a shift lever adapted to be connected to the engine clutch for actuation thereof in response to shift lever movement, said shift lever being movably mounted on said housing for movement between a neutral position and a shift position in response to movement of said shift lever, and means connecting said shaft member to said shift lever so as selectively to move said shift lever from the neutral position to the shift position in response to rotational movement of said control lever from the neutral position, said means connecting said shaft member to said shift lever being releaseable so as to permit relative rotation between said shaft member and said shift lever in response to rotational movement of said control lever, said means releaseably connecting said shaft member to said shift lever including means supporting said shaft member for axial movement relative to said housing between first and second positions in response to axial movement of said control lever, a shift drive member mounted on said shaft member for relative rotary movement therebetween, means connecting said shift lever and said shift drive member for movement of said shift lever in response to rotary movement of said shift drive member, and drive means for releaseably connecting said shaft member and said shift drive member to provide common rotary movement of said shaft member and said shift drive member when said shaft member is in the first position and to permit relative rotation between said shaft member and said shift drive member, in response to rotational movement of said control lever, when said shaft member is in the second position.*

* * * * *